United States Patent [19]

Mitsumori et al.

[11] Patent Number: 5,109,508
[45] Date of Patent: Apr. 28, 1992

[54] DATA BASE SYSTEM INCLUDING MEMORANDUM INFORMATION AND METHOD FOR MANAGING MEMORANDUM INFORMATION

[75] Inventors: Sadamichi Mitsumori, Hachioji; Shigeru Mitani, Kawasaki; Yasufumi Fujii, Yokohama; Osamu Chinone, Tokyo; Isoji Tabushi, Kamakura, all of Japan

[73] Assignee: Hitachi, Ltd., Tokyo, Japan

[21] Appl. No.: 301,662

[22] Filed: Jan. 25, 1989

[30] Foreign Application Priority Data

Jan. 29, 1988 [JP] Japan ................ 63-17077

[51] Int. Cl.⁵ .............................. G06F 15/40
[52] U.S. Cl. ................. 395/600; 364/282.1; 364/283.1; 364/283.3
[58] Field of Search ... 364/200 MS File, 900 MS File, 364/521, 419

[56] References Cited

U.S. PATENT DOCUMENTS

| | | | |
|---|---|---|---|
| 4,716,404 | 12/1987 | Tabata et al. | 364/521 |
| 4,748,678 | 5/1988 | Takeda et al. | 364/518 |
| 4,817,050 | 3/1989 | Komatsu et al. | 364/900 |
| 4,868,733 | 9/1989 | Fujisawa et al. | 364/200 |
| 4,912,640 | 3/1990 | Tsugei | 364/400 |

Primary Examiner—Michael R. Fleming
Assistant Examiner—Debra A. Chun
Attorney, Agent, or Firm—Fay, Sharpe, Beall, Fagan, Minnich & McKee

[57] ABSTRACT

A data management method and system of memo information utilizing a data base can store personal memo information at a high storage efficiency and a high retrieval efficiency without adding a retrieval key to the data base. The data management system may be constructed by connecting a work station having a file for storing memo information to an existing data base system. The system has keys for indicating records of the data base and storage addresses of the corresponding memo information as a connective index file, and refers to it to store, retrieve or delete the memo information. A plurality of memo information for the same record may be displayed on a display of the work station in a time sequence and the memo information are paged.

16 Claims, 7 Drawing Sheets

DATA BASE SYSTEM INCLUDING MEMORANDUM INFORMATION AND METHOD FOR MANAGING MEMORANDUM INFORMATION

BACKGROUND OF THE INVENTION

The present invention relates to a data base system including memorandum information and a method for managing the memorandum information, and more particularly to a data base management system and a method for managing memorandum information in which a user of the data base system manages personal information (referred to as memorandum information) relating to data of the data base on a work station, in on-line information processing system comprising a host computer including the data base and work stations coupled to the host computer.

Information handled in an enterprise may be classified into organization information and personal information.

Organization information is official information in an organization and shared by the organization members. In order to store, retrieve and update large amounts of organization information, various types of data base management systems are developed.

Personal information is not official information in an organization. It is collected and modified by each organization member to smoothly process his assigned jobs. The personal information is normally not opened for use by others but it may be handed to others in the form of memorandum or document with his permission.

A conventional data base management system (DBMS) is for the organization information in which a data structure (expression and format of data) has been defined before a data is inputted. The data can be readily stored, retrieved and updated.

On the other hand, the personal information has no fixed data structure and, is in many cases, image information such as memorandums and charts.

Such personal information in memorandum form (memorandum information) is written on memo papers by the the person in charge, and they are classified by fields. In order for these memorandums to be utilized later, they must be well classified and rearranged. It is troublesome work and valuable information may be dispersed or a promise to a customer may not be kept. As a result, the person in charge may lose his/her credit.

The memorandum information of non-fixed (non-routine) data structure may be stored on an optical disk in a compact manner. In order to allow exact retrieval of desired information, it is necessary to assign a search key to each memorandum. This does not make a significant difference from the paper memorandums from the standpoint of classification and rearrangement.

SUMMARY OF THE INVENTION

It is an object of the present invention to provide a memorandum information data management method and system which can store personal memorandum information (particularly those related to data base information of a host computer) without requiring users to define and assign search keys and which assures high storage efficiency and high search efficiency.

Other objects of the present invention will be apparent from the following description and the accompanying drawings.

In order to achieve the above object, in accordance with the present invention, the data base management system comprises a first storage medium of a data base, a host computer having a function to control input/output of data to and from the data base, a work station, and a channel for transmitting information between the host computer and the work station. The work station comprises an input device for inputting memorandum information relating to records of the data base, a second storage medium for storing the memorandum information, a connective retrieval table (also referred to as a connective index file) which registers both a location address of each memorandum on the second storage medium and a primary key of the record in the data base where the memorandum is logically attached, and a processor for storing, retrieving and updating the memorandum by using the input device, the second storage medium and the connective retrieved table.

In a preferred embodiment, the second storage medium may be an optical disk and the memorandum information is stored in the optical disk in the form of image information.

In the memorandum information management system, the memorandum information is managed in the following steps.

When a memorandum is to be logically added to a record of the data base for the first time, a primary key of the record is keyed in, and the memorandum is written into the second storage medium through the input device together with the primary key in order to construct a memorandum file. Both the primary key and the address on the second storage medium at which the memorandum is stored are registered in the connective retrieval table.

When a plurality of memorandums are to be logically added to the record, pointers indicating mutual connection are added. The memorandums are stored in the memorandum file in a sequence of storing and retrieved in time sequence, that is, in a first-in first-out fashion or in the opposite fashion.

The addresses on the memorandum file at which the oldest and latest memorandums are stored (hereinafter called head address and end address respectively) are recorded in the connective index table.

When a memorandum is to be retrieved, a primary key of the record on which the memorandum is logically added is inputted so that the memorandum item is displayed on the display of the work station.

Where a plurality of memorandums are logically added to the record, the primary key is not only specified, but also an indication of "latest" or "oldest" must be specified to designate whether the memorandums are to be retrieved from the latest or the oldest.

Then, paging retrieval is carried out as required. In the paging retrieval mode, a memorandum which has been stored immediately earlier or later than the memorandum which is currently displayed is retrieved and displayed. If a forward paging retrieval command is executed when a memorandum is being displayed, the memorandum which has been stored immediately later than that is displayed, and if a backward paging retrieval command is executed, the memorandum which has been stored immediately earlier than that is displayed.

The memorandum which is no longer necessary is deleted in the following manner. The unnecessary memorandum is deleted in a memorandum deletion process. There are three modes in the memorandum deletion, that is, a specified memorandum deletion mode, a specified record memorandum deletion mode and total memorandum deletion mode. In the specified memorandum deletion mode, the memorandum to be deleted is displayed on the display (CRT) and the delete command is executed. In the specified record memorandum deletion mode, total memorandums logically added to a record of the data base is deleted. They may be deleted by the total memorandum delete command while one of the memorandums is displayed, or by specifying the primary key which points the record. In the total memorandum deletion mode, total memorandum logically added to one data base is collectively deleted by specifying the file name and executing the total memorandum delete command.

In accordance with the present invention, the personal information is processed as if a user of the data base management system pastes his/her personal memorandums to records of the data base. Accordingly, personal information may be sorted and classified by the data base without special rearrangement for the memorandums.

A record of the data base and the memorandum logically added to the record can be simultaneously retrieved by specifying the primary key indicating record of the data base, with a high retrieval efficiency.

When a plurality of memorandums are to be logically added to a record, only the primary key and pointers connecting these memorandums need to be added in addition to these memorandums. Accordingly, an efficiency of storing the memorandums is not decreased.

DETAILED DESCRIPTION OF THE PREFERRED EMBODIMENTS

Figure 1:
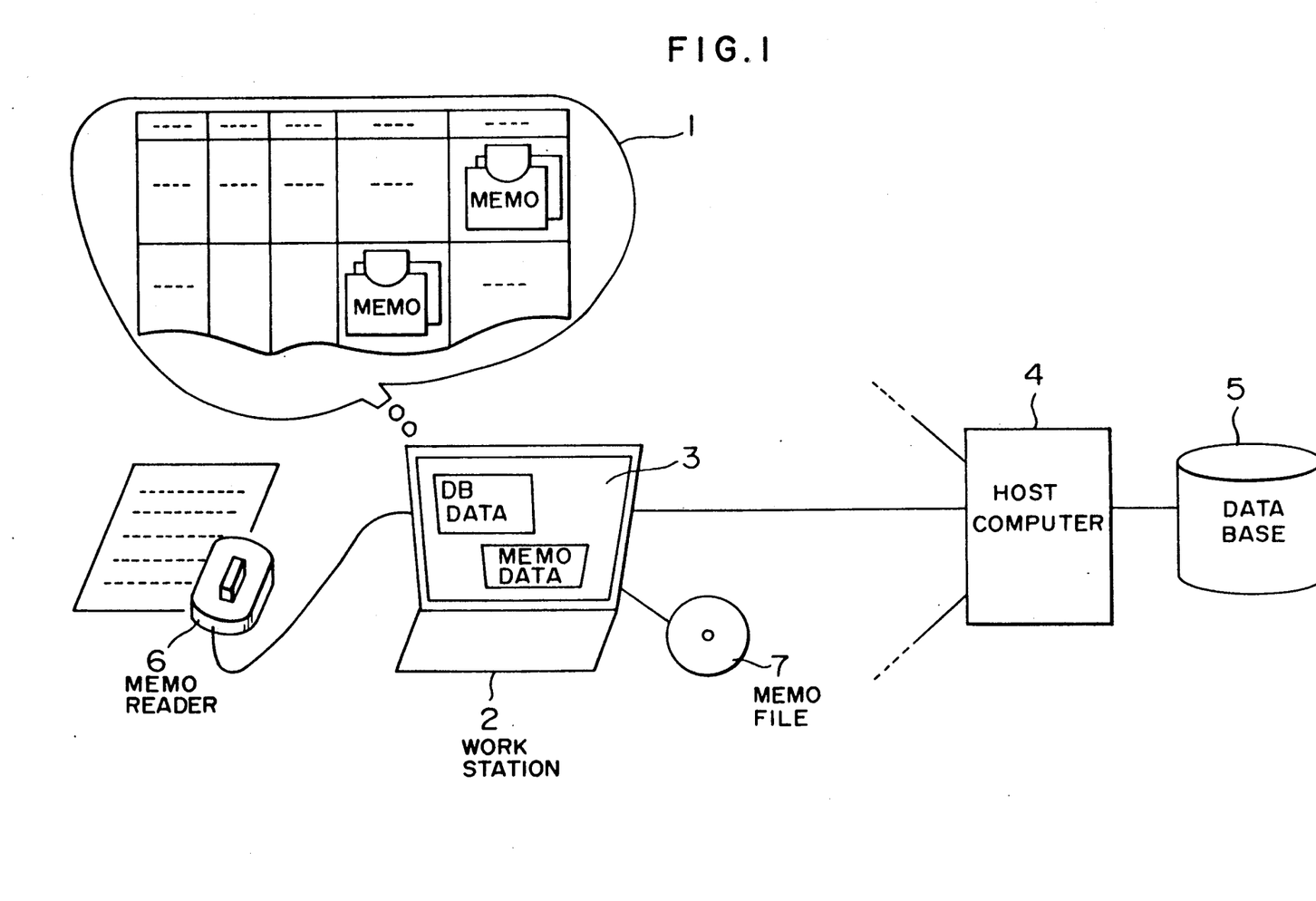
FIG. 1 shows a conceptual view of one embodiment of the present invention.

FIG. 1 shows a configuration of one embodiment of a memorandum information management system of the present invention.

Numeral 1 denotes a functional image which a user of the present system may understand through a viewer 3 of a work station 2. A table drawn in the image 1 is an image of a data base 5 in a host computer 4. A row of the table corresponds to a record of the data base. The data base 5 is a given one for the user of the system. Memorandum (hereinafter referred to as memos) attached to the rows of the table in the image 1 have been prepared by the user and inputted through a memo reader 6 of the work station 2 to logically add to the records. Normally, a plurality of memos are logically added to some rows and they are arranged in an input sequence. A frontmost memo is a latest one and a rearmost memo is an oldest one, or vice versa. Usually, a plurality of persons logically adds memos to the records of the data base 5 of the host computer 4. The memos of each person should not be disclosed to other persons. If the memos of one user and the memos of other users are logically added to the same rows (record) of the data base 5, the user may be troubled. Accordingly, the memos are to be managed separately by each user.

In order to achieve the above function, the memos are inputted through the memo reader 6 of each work station 2 and stored into a storage medium (memo file) 7 of the work station 2. The memos may be keyed in.

Figure 2:
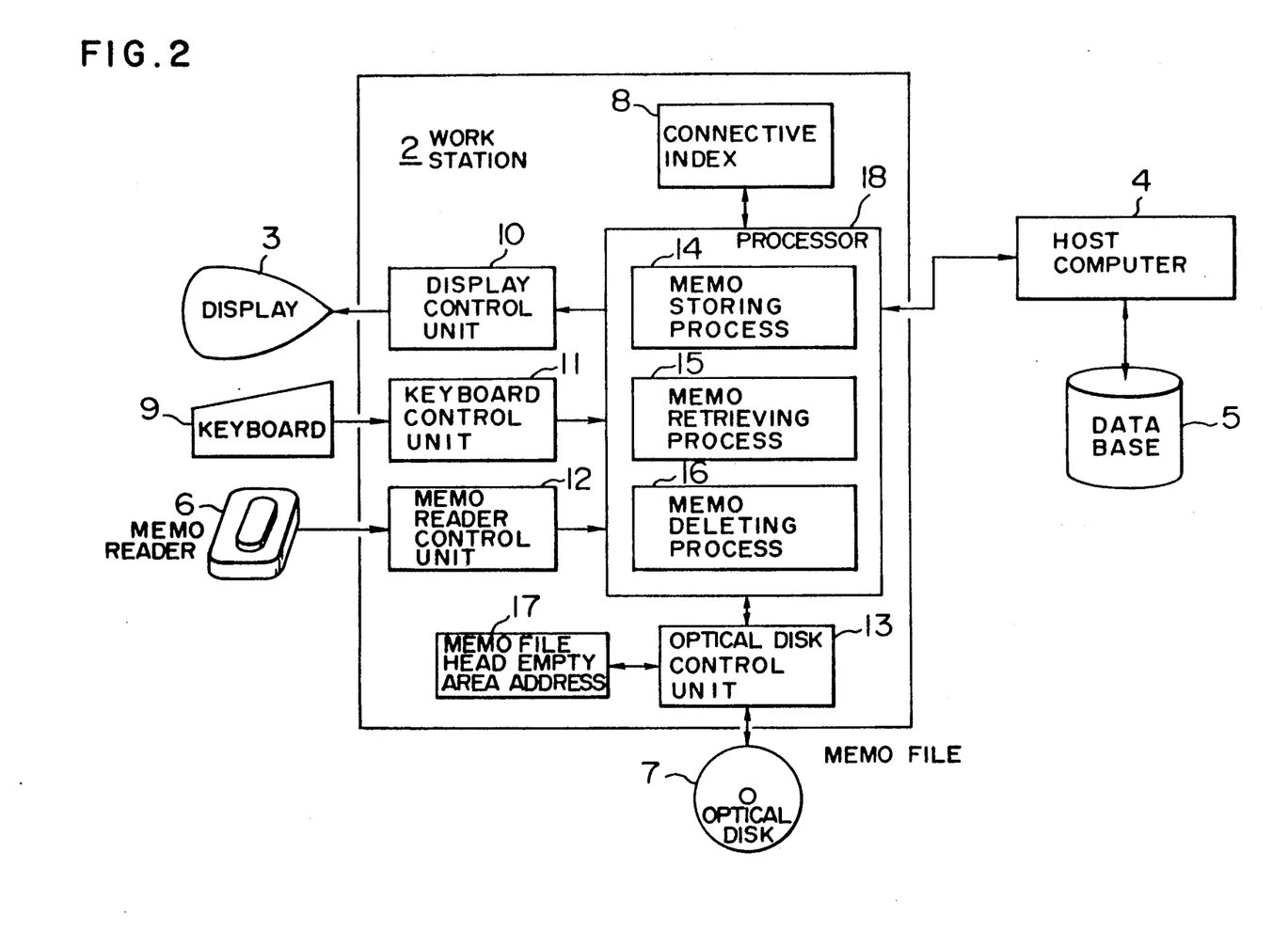
FIG. 2 shows a configuration of one embodiment of a memorandum information management system of the present invention.

FIG. 2 shows a configuration of one embodiment of the memorandum information system which attains the above function. Numerals 10, 11, 12 and 13 denote display controller, keyboard controller, memo reader controller and optical disk controller, respectively, which are controllers of peripheral equipments of the work station. Those are conventional ones. Numerals 14, 15 and 16 denote a process for storing a memo by logically adding to the data base of the host computer, process for retrieving the stored memos, and process for deleting the memo, respectively. They are processed by a processor 18. The connective retrieval table (connective index) 8 of the work station 2 indicates which record of the data base 5 the input memo is logically added to. Accordingly, when a memo is to be logically added to a record at a first time, a name of the record, or the primary key is registered in the connective index 8. An address in the memo file 7 in which the memo logically added to the record is stored is also registered in the connective index 8. The connective index 8 may be a table in a storage (not shown) in the work station 2. Where a plurality of optical disks are used as the memo files 7, if the connective indexes of all optical disks are provided in the storage of the work station 2, a large storage capacity is required. Accordingly, a connective index table for each optical disk is provided in each optical disk, and the connective index tables in the optical disks are loaded to the storage of the work station prior to the utilization of the system. In this manner, the utilization efficiency of the storage in the work station is improved and the work station 2 can be shared by a plurality of users by the personal management of the optical disks.

Figure 3:
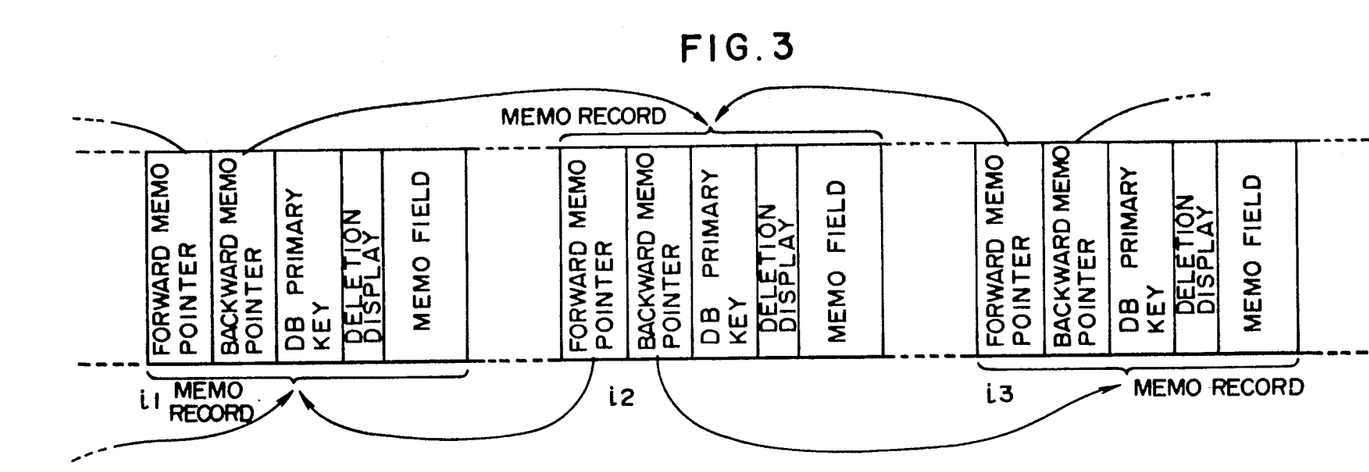
FIG. 3 shows a structure of a memorandum file of FIG. 2.
Figure 4:
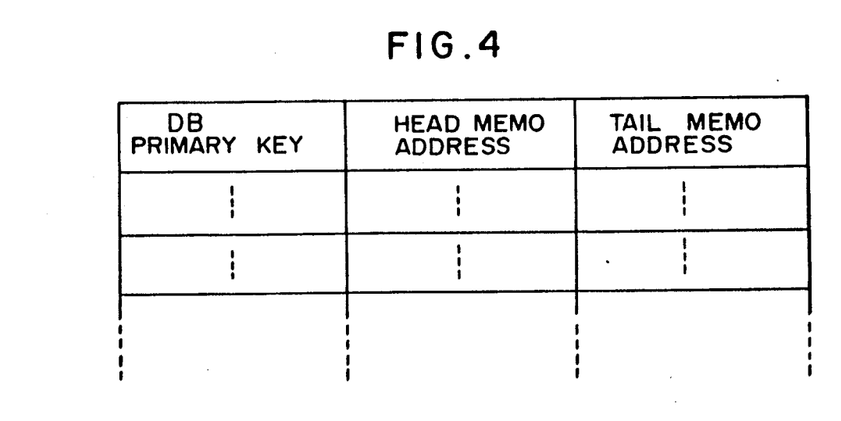
FIG. 4 shows a structure of a connective index file of FIG. 2.

An internal structure of the connective index 8 and an internal structure of a memo file 7 are shown in FIGS. 4 and 3, respectively. The memo files 7 are stored in the storing sequence. A head empty area address of the memo file is stored in a register 17 to indicate a place where the next memo is to be stored.

In FIG. 3, subunits $i_1$, $i_2$ and $i_3$ denote storage areas for respective memos in the memo file 7. And memo records are stored therein. The memo record comprises a memo field which contains an occurrence of the memo, a forward memo pointer field, a backward memo pointer field and a data base (DB) primary key field. The memos of a user are stored in the memo file 7 in the input sequence, irrespective of the records of the data base to which the memos are to be logically added. As a result, the storage efficiency of the storage medium of the memo file 7 is enhanced. Because of such storage format, some memos logically added to a record of the data base may be discontinuously stored as shown by $i_1$, $i_2$ and $i_3$ in FIG. 3. The forward memo pointer and backward memo pointer serve to manage the memos added to the same record of the data base, in the storing sequence. The storage location of the memo record i₁ (or i₃) which has been recorded immediately earlier (or later) than the memo record i₂ is registered as the forward memo pointer (or backward memo pointer) (field) of the memo record i₂. The DB primary key of the memo record is a primary key (uniquely identifying key) of the data base which indicates the record to which the memo is logically added. Since the memos logically attached to a record of the data base are bidirectionally connected by the forward memo pointer and the backward memo pointer, those memos can be retrieved in either first-in first-out sequence or the opposite sequence. A deletion display field of the memo record will be described later.

The structure of the connective index 8 shown in FIG. 4 is now explained. The connective index is used to queue the memos logically added to a record of a data base. In the queuing, either the first stored memo or last stored memo is queued. Accordingly, the connective index 8 comprises three fields, DB primary key field, head memo address field and tail memo address field. When a memo is logically added to a record of a data base at a first time, one key record is registered in the connective index. It comprises a DB primary key field for indicating the record of the data base to which the memo is added, and a head memo address field and a tail memo address field for indicating the location in the memo file 7 at which the memo is stored and ended respectively. Since only one memo is logically added to the record at the first time, the content of the head memo address field and the content of the tail memo address field are equal.

The operation of the above embodiment is explained with reference to FIGS. 5 to 8.

Figure 5:
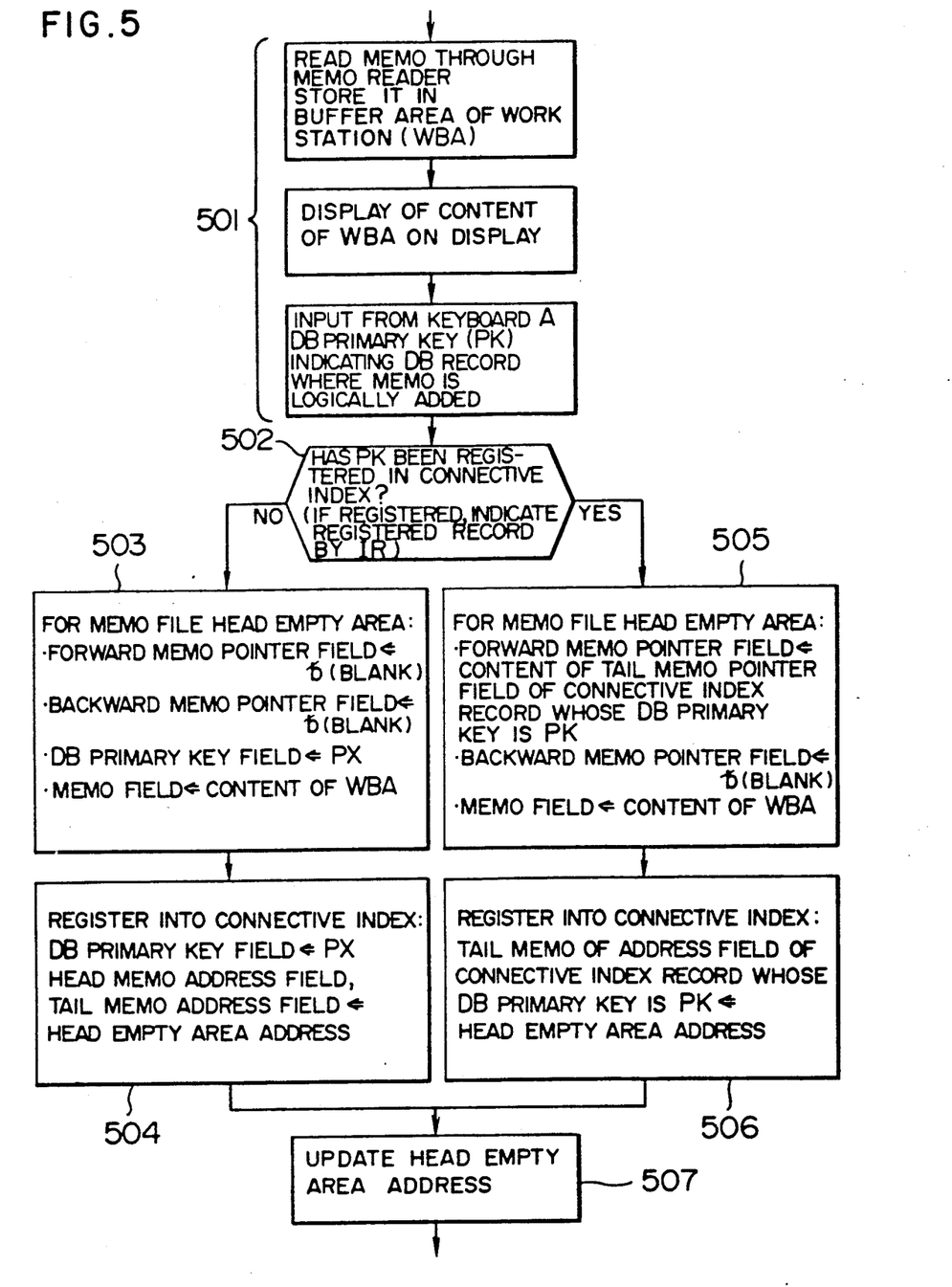
FIG. 5 shows a flow chart of a memorandum storing process.

The memo storing process 14 of FIG. 2 is shown in FIG. 5. In a first step 501, a memo is read by the memo reader 6 and a primary key which indicates the record of the data base 5 to which the memo is to be logically attached is inputted from the keyboard 9. When a record of the data base 5 is displayed on the display 3, it may be designated by a cursor to identify the record.

In a step 502, whether the memo is logically attached to the record of the data base 5 at the first time or not, the subsequent steps differ. This is determined by whether primary index of the record is registered or not in the connective index 8.

If it is the first registration, steps 503 and 504 are carried out. In the step 503, the memo is stored in the memo file 7. Since no memo has been added to the memo record, the forward memo pointer and the backward memo pointer are left blank. The primary key (PK) of the record of the data base to which the memo is to be logically added is entered into the DB primary key field. In the step 504, the primary key (PK) of the data base to which the memo is to be logically attached is registered in the DB primary key field of the connective index 8 as a new key record, and the head empty area address in the memo file 7 which is the content of the register 17 is registered in both the head memo address field and the tail memo address field.

If the memo is second or subsequent addition to the record of the data base 5, steps 505 and 506 are carried out. In the step 505, the memo is stored in the memo file 7. The step 505 differs from the step 503 in that the memo previously added to the record is referred to. To this end, the address of the memo previously added is written into the forward memo pointer field of the memo record. The address is derived from the connective index. In the step 506, the addition of the memo is registered in the connective index 8. Namely, the storage address of the memo is written into the tail memo address field of the key record corresponding to the record.

In a step 507, the address at which the memo next read is to be stored, that is, the head empty area address 17 is updated.

Figure 6:
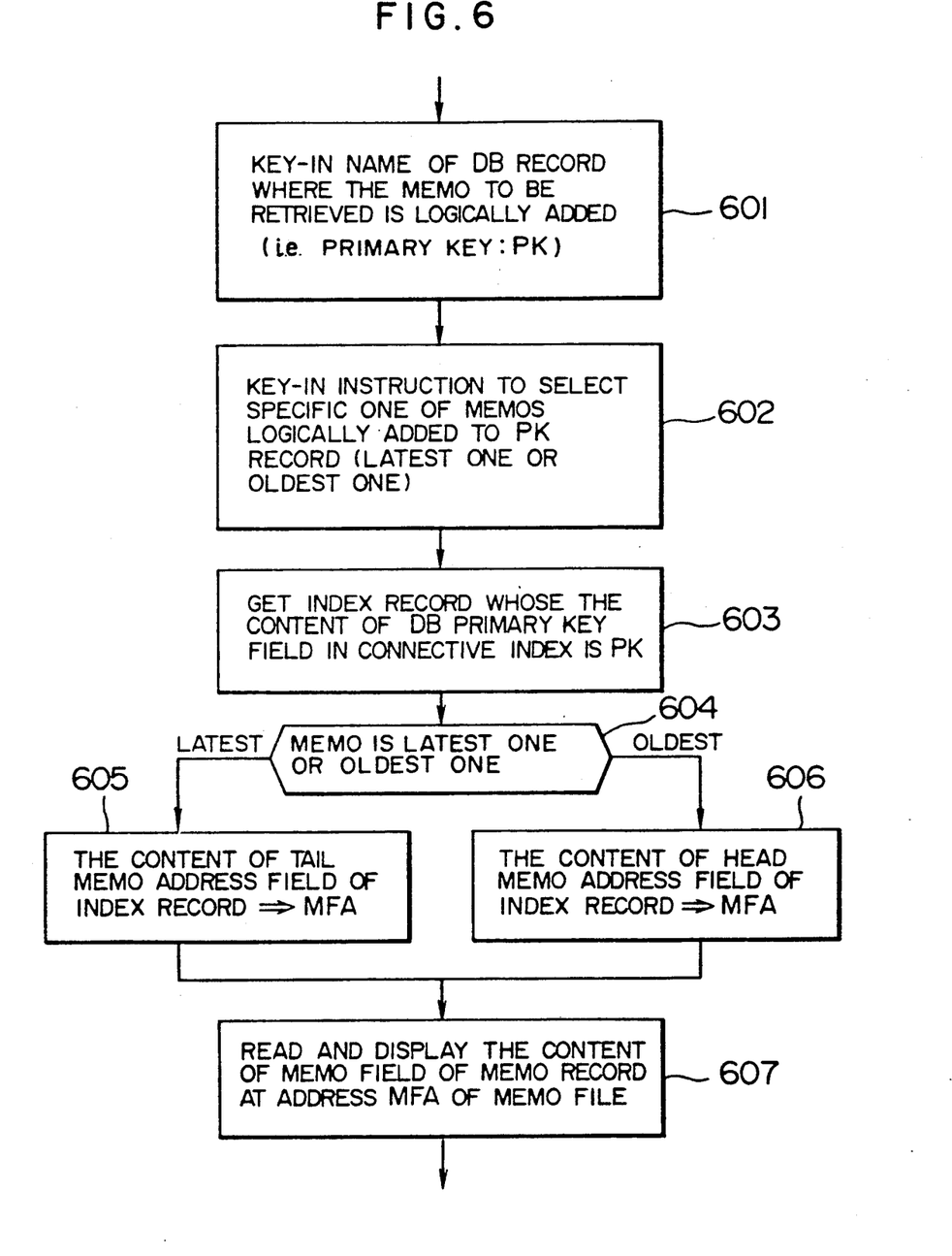
FIGS. 6 and 7 show flow charts of a memorandum retrieving process.
Figure 7:
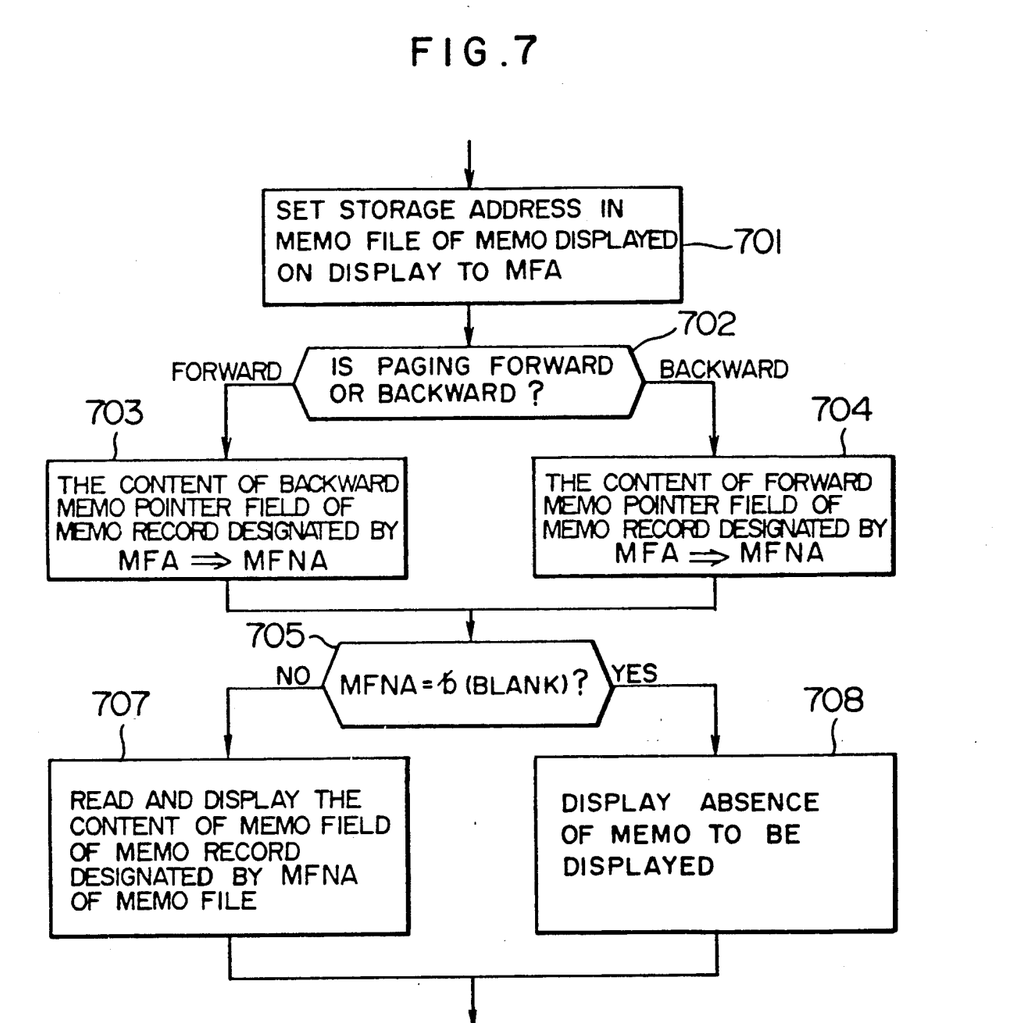

FIGS. 6 and 7 show the flow charts of a process for retrieving a specified memo.

FIG. 6 shows a process to read the latest or oldest memo added to a specific record.

The name of the record of the data base to which the memo to be retrieved has been logically added, that is, the primary key is entered by the keyboard 9 (step 601).

Then, either the latest one or oldest one of the memos added to the record specified by the primary key is specified (step 602). Then, the index record where the content of the primary key field in the connective index is equal to the keyed in primary key is obtained (step 603).

Depending on the decision (step 604) on the latest one or oldest one of the memo to be read, the tail memo address of the obtained index record is written into a MFA (a work area in the storage of the processor 18) if it is the latest one, and the head address of the obtained index record is written into the MFA if it is the oldest one (step 606).

The memo field of the memo record of the address MFA of the memo file 7 is read and displayed (step 607). Since the above steps are queuing of the memo, the address of the memo in the memo file may be determined by using only the connective index.

The above steps may be applied to the memos added to the record of the data base to overdisplay the memos on the display (see FIG. 1). The number of memos may be readily counted by displaying the memos in such a manner that the rear memo is staggered from the front memo.

FIG. 7 shows a flow chart of the process in which one of the memos added to the record of the data base is displayed and the following or previous one of the memos is read.

The storage address in the memo file of the memo currently displayed on the display is set to MFA (step 701). Depending on whether the paging is forward or backward (step 702), the backward memo pointer of the memo record indicated by MFA is registered in MFNA (a work area in the storage of the processor 18) if the paging is forward, and the forward memo pointer of the memo record indicated by MFA is registered in MFNA if the paging is backward (step 704).

Whether the MFNA is blank or not is checked (step 705), and if it is not blank, the memo field of the memo record designated by the MFNA of the memo file is read and displayed on the display (step 707). If the MFNA is blank, absence of memo to be displayed is displayed (step 708).

Figure 8:
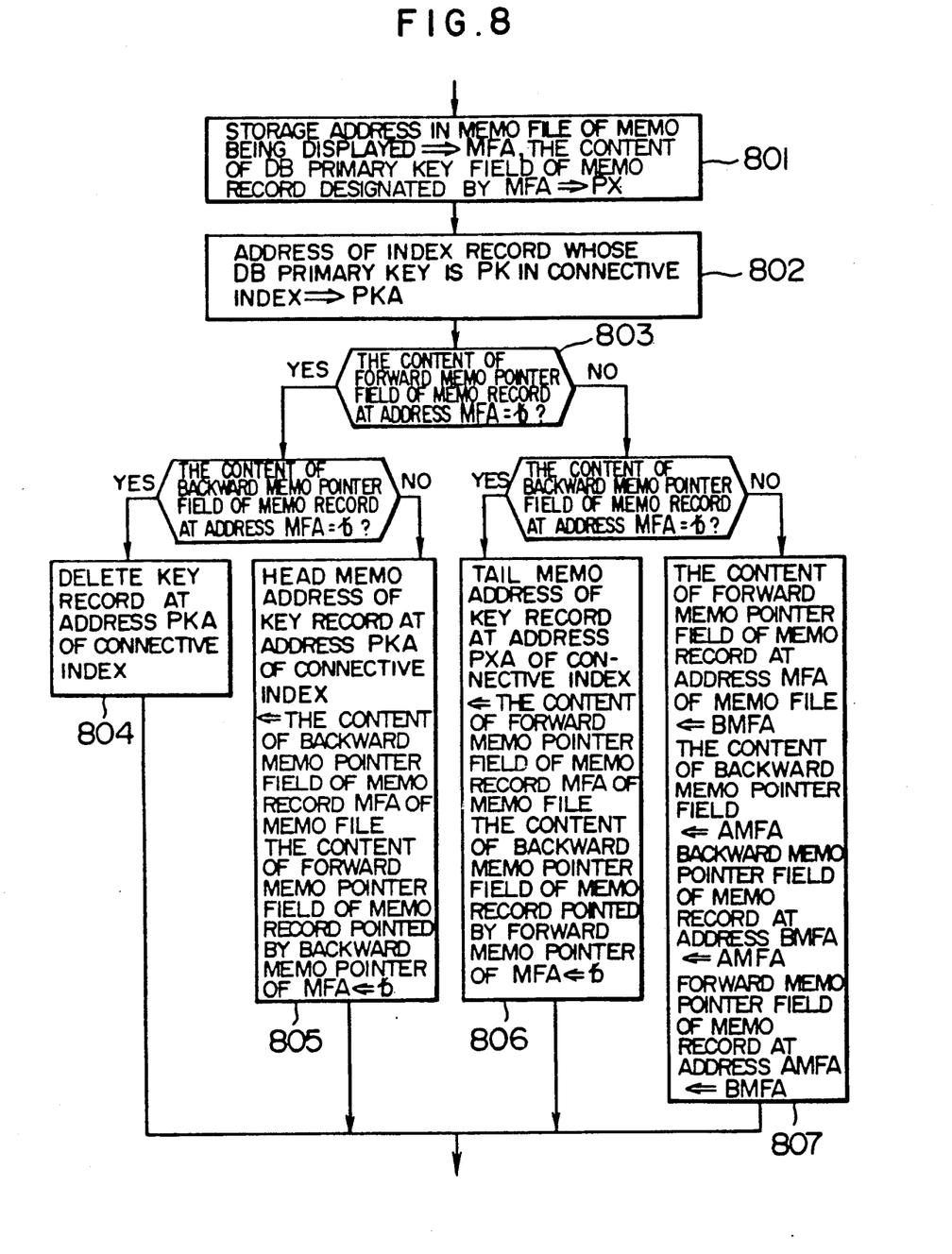
FIG. 8 shows a flow chart of a memorandum deleting process.

FIG. 8 shows a flow chart of a process to delete a memo displayed on the display.

The storage address in the memo file of the memo displayed on the display is registered in the MFA, and the DP primary key of the memo record designated by the MFA is set to PK (step 801).

The address of the index record whose DB primary key is PK in the connective index is set to PKA (step 802).

Whether the forward memo pointer of the memo record at the address MFA is blank or not is checked (step 803).

If the forward memo pointer is blank in the step 803 and the backward memo pointer is also blank, it indicates that the memo is only one. In this case, the key record at the address PAK of the connective index is deleted (step 804).

If the forward memo pointer is blank and the backward memo pointer is not blank, that is, if the memo is the oldest one of the memos, the head memo address of the key record at the address PAK of the connective index 8 is set to the backward memo pointer of the memo record MFA of the memo file, and the forward memo pointer of the memo record pointed by the backward memo pointer of MFA is rendered blank (step 805).

When both the forward memo pointer and the backward memo pointer of the memo record are not blank, that is, when the memo is at an intermediate position in the memo group, a step 807 is carried out. When the forward memo pointer of the memo record is not blank and the backward memo pointer is blank, that is, when the memo is the latest one, a step 806 is carried out.

It should be noted that, in any case, the deleted memo remains in the memo file. It has merely deleted from the memo group to which it belonged. It is risky to delete it from the memo file because it may be needed later.

The memo file is preferably an optical disk from a storage cost standpoint. When a write once type optical disk is used to further reduce the storage cost, it is not possible to update the two pointers in the memo record. In this case, the deletion of memo may be indicated by the deletion field of the memo record (see FIG. 3). Memory cards such as optical memory cards, IC cards and magnetic cards having a large storage capacity may be used for the memo file, and also for the index table storage, depending on applications.

In the present embodiment, the display is used as the output device, a printer may be connected to print out the memo information or make a hard copy of the display screen so that the memo information may be carried.

In accordance with the present invention, the memos prepared by the user of the operator may be stored and retrieved in relation to the data base in a later work. Accordingly, the computerization of the work in the marketing activities and general office works which has heretofore been difficult to attain by conventional information processing is attained and a number of jobs may be performed by one person.

The present invention is attained by merely developing the work station without modifying the existing host system (including the data base). Accordingly, a large manpower is not required to attain the apparatus of the present invention.

We claim:

1. A data base system capable of adding, retrieving and deleting memo information comprising:

a first storage means for storing a data base;

a first processor in operative communication with said first storage means for managing an input and output of data to and from the data base;

a second storage means for storing memo information to be logically attached to said data base;

a third storage means comprising a connective index for storing relational information representing to which record of the data base a memo information is logically attached; and, a second processor connected to said first processor, said second storage means and said third storage means for adding, retrieving and deleting the memo information to and from said second storage means by adding, retrieving and deleting the relational information to and from the connective index in said third storage means.

2. The data base system according to claim 1, wherein said memo information attached to records of the data base in said second storage means is image information stored in time sequence.

3. A data base system having memo information comprising:

(a) a first storage means for storing a data base;

(b) a first processor in operative communication with said data base for managing an input and output of data to and from said data base;

(c) at least one second storage means for storing memo information to be logically attached to said data base; and (d) a work station provided for each second storage means including:

(d-1) a third storage means comprising a connective index for storing relational information representing to which record of said data base a memo information is logically attached; and, (d-2) a second processor connected to said first processor, said second storage means and said third storage means for adding, retrieving and deleting the memo information to and from said second storage means by adding, retrieving or deleting the relational information to and from the connective index in said third storage means.

4. A data base system having memo information comprising:

(a) a first storage means for storing a data base;

(b) a first processor in operative communication with said first storage means for managing an input and output of data to and from said data base;

(c) as storage medium including;

(c-1) an area for storing memo information to be logically attached to said data base; and (c-2) an area for storing relational information representing to which record of said data base a memo information is logically attached;

(d) a storage control unit for writing and reading the memo information and the corresponding relational information to and from said storage medium;

(e) a second storage means; and (f) a second processor connected to said first processor, said storage control unit and said second storage means for (f-1) reading the corresponding relational information from said storage medium through a memory control unit and storing the corresponding relational information into said second storage means, and (f-2) storing, retrieving and deleting the memo information of said storage medium through said storage control unit by referring to the corresponding relational information stored in said storage medium.

5. A method for managing memo information utilizing a data base, wherein a connective index registers both a primary key indicating a record of the data base to which the memo information is to be logically attached an a location address of the memo file where the memo information is physically stored, the method comprising the steps of:
(1) storing the memo information including
  (1-a) physically storing the memo information in a storage medium, and
  (1-b) storing into the connective index file both a primary key indicating a record of the data base to which the memo information is to be attached and a location address of the memo file where the memo information is stored; and
(2) retrieving the memo information including
  (2-a) outputting a record of the data base by said processor,
  (2-b) by using the connective index, retrieving the location address of the memo file where the memo information to be logically attached to the record is physically stored, and
  (2-c) outputting the memo information to an output device controlled by said processor by using the location address of the memo file.

6. The method for managing memo information according to claim 5, wherein said step (2-c) further includes a step for outputting the memo information logically attached to the record which a user retrieves from the data base.

7. The method for managing memo information according to claim 5, wherein said memo information is attached to one record of the data base, the memo information is recorded in the memo file in a storing sequence, a pointer indicating the storing sequence is added to a record field of each memo information, head and tail addresses of the firstly and lastly stored memo information are recorded as addresses of the memo file in said connective index file, and said memo information is outputted in a time sequence or an inversed time sequence by referencing the pointers of the head or tail address when the memo information is retrieved.

8. The method for managing memo information according to claim 5 wherein the memo information is image information.

9. A method for managing memo information according to claim 5, wherein said step 2(c) further includes a step for outputting the memo information stored at the memo file, said memo information corresponding to the input information representing the records of the data base.

10. A method for managing memo information utilizing a data base wherein a connective index registers both a primary key indicating a record of the data base to which the memo information is to be logically attached and a location address of the memo file where the memo information is physically stored, the method comprising the steps of:
(1) inputting to a processor the memo information;
(2) inputting to said processor the primary key indicating the record of the data base;
(3) storing by said processor to the memo file both the input memo information and the information indicating the record of the data base to which the memo information is to be logically attached; and
(4) storing by said processor to the connective index both the location address of the memo file where the input memo is physically stored and the information indicating the record of the data base to which the memo information is to be logically attached.

11. The method for managing memo information according to claim 10, the method further comprising the steps of:
(5) displaying by the processor on a display a part of said memo information attached to the record of the data base comprising the input information indicating the record of the data base,
(6) detecting by using said connective index the location address in the memo file of the memo information which corresponds to the input information indicating the record of the data base, and
(7) displaying by said processor said memo information stored at the detected address on the display.

12. The method for managing memo information according to claim 11, wherein there are a plurality of memo information corresponding to the input information indicating the record of the data base, and said step (7) for displaying the memo information further includes a step of displaying on a display the plurality of memo information in such a manner that rear memo information is partially viewed.

13. The method for managing memo information according to claim 12, the method further comprising the steps of designating said memo information as "latest" or "oldest", and when "latest" is designated, overdisplaying the memo information in a storing sequence with the latest one being frontmost and the oldest one being rearmost, and when the "oldest" is designated, overdisplaying the memo information in the opposite sequence.

14. The method for managing memo information according to claim 13, the method comprising the steps of designating said memo information as "forward" or "backward", and when "forward" is designated, the memo information next to the frontmost displayed memo information is overdisplayed frontmost, and when "backward" is designated, the memo information to be displayed in front of the frontmost displayed memo information is overdisplayed frontmost.

15. A data base system including a storage means for storing a data base, a first processor operative with said storage means for managing the data base, and a terminal connected with said storage means and said first processor for accessing said data base storage, said terminal including a second processor connected to said first processor and a storage device for processing data from the data base storage means, wherein
said storage device comprises:
a first storage area for storing memo information to be logically attached to said data base; and
a second storage area for storing a relational information representing which record of said data base a memo information is logically attached to, whereby sad second processor refers to the information stored in said second storage area in response to an instruction by an operator to perform at least one of addition, retrieval and deletion of the memo information to and from said first storage area of the storage device.

16. The storage device according to claim 15, wherein said storage device is portable and disconnectable from said terminal.

* * * * *